(12) United States Patent
Bond et al.

(10) Patent No.: US 11,981,279 B2
(45) Date of Patent: May 14, 2024

(54) SYSTEM FOR NOTIFYING AN OCCUPANT OF A VEHICLE OF UNAUTHORIZED ACCESS TO HIS OR HER POSSESSIONS

(71) Applicant: GM Global Technology Operations LLC, Detroit, MI (US)

(72) Inventors: Jacob Alan Bond, Rochester Hills, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 110 days.

(21) Appl. No.: 17/809,053

(22) Filed: Jun. 27, 2022

(65) Prior Publication Data
US 2023/0415689 A1    Dec. 28, 2023

(51) Int. Cl.
*B60R 21/015* (2006.01)
*G06V 40/10* (2022.01)

(52) U.S. Cl.
CPC .. *B60R 21/01538* (2014.10); *B60R 21/01542* (2014.10); *G06V 40/10* (2022.01)

(58) Field of Classification Search
CPC ........ B60R 21/01538; B60R 21/01542; G06V 40/10
See application file for complete search history.

(56) References Cited

U.S. PATENT DOCUMENTS

| | | | | |
|---|---|---|---|---|
| 11,544,924 B1* | 1/2023 | Lee | ................. | G08B 13/19608 |
| 2018/0074494 A1* | 3/2018 | Myers | ................. | H04W 4/029 |
| 2019/0251376 A1 | 8/2019 | Stoffel et al. | | |
| 2021/0074144 A1* | 3/2021 | Abe | ................. | G08B 3/10 |
| 2021/0089798 A1* | 3/2021 | Shah | ................. | G06V 10/75 |

OTHER PUBLICATIONS

The German Patent and Trade Mark Office. First Office Action for DE Application No. 10202227220.6 and English Translation, mailed Feb. 10, 2023.

* cited by examiner

*Primary Examiner* — Michael Lee
(74) *Attorney, Agent, or Firm* — Vivacqua Crane, PLLC

(57) ABSTRACT

A system for notifying an occupant of a vehicle of unauthorized interaction with his or her possessions includes one or more cameras that collect image data of a surrounding environment of the occupant. The surrounding environment of the occupant is an interior cabin of the vehicle. The system also includes one or more controllers in electronic communication with the one or more cameras, the one or more controllers execute instructions to monitor, by the one or more cameras, the image data of the surrounding environment of the occupant. In response to detecting the unauthorized interaction with the one or more possessions associated with the occupant, the one or more controllers generate a notification informing the occupant of the unauthorized interaction.

20 Claims, 2 Drawing Sheets

SYSTEM FOR NOTIFYING AN OCCUPANT OF A VEHICLE OF UNAUTHORIZED ACCESS TO HIS OR HER POSSESSIONS

INTRODUCTION

The present disclosure relates to a system for notifying an occupant of a vehicle of unauthorized access to his or her possessions.

Ridesharing is a form of shared mobility where multiple passengers reach their intended destination by sharing a common vehicle. The common vehicle may make multiple stops along a route to pick up and drop off passengers, thereby reducing the need for multiple vehicles on the road. Ridesharing provides many benefits such as, for example, reducing traffic congestion as well as vehicle emissions. Furthermore, ridesharing may offer vision-impaired individuals, who are unable to drive because of their reduced vision, an affordable and relatively convenient mode of transportation.

Passengers may decide to bring various personal possessions, such as a purse, backpack, books, smartphones, laptops, tablets, and other types of electronic devices along with them when riding in a common vehicle. During the ride, a passenger may decide to take a nap, read, listen to music on headphones, or relax. However, when a passenger is sleeping or otherwise distracted, he or she may not be able to watch over his or her possessions, and a second passenger who is also onboard the vehicle may have the opportunity to interact with the passenger's possessions, without the passenger's knowledge or authorization. Specifically, for example, a second passenger may have an opportunity to take and carry the passenger's possessions while exiting the vehicle at his or her designated drop off location, without the passenger's knowledge. For example, the second passenger may take and carry away the passenger's tablet while the passenger is napping. In the alternative, if a passenger is vision-impaired, he or she may not be able to see when the second passenger interacts with his or her possessions.

Thus, while current vehicles for ridesharing achieve their intended purpose, there is a need in the art for an improved approach that notifies passengers when an individual is interacting with their possessions without their authorization.

SUMMARY

According to several aspects, a system for notifying an occupant of a vehicle of unauthorized interaction with one or more possessions is disclosed. The system includes one or more cameras that collect image data of a surrounding environment of the occupant, where the surrounding environment of the occupant is an interior cabin of the vehicle and one or more controllers in electronic communication with the one or more cameras. The one or more controllers execute instructions to monitor, by the one or more cameras, the image data of the surrounding environment of the occupant. The one or more controllers determine an entrance event based on analyzing the image data of the surrounding environment, where the entrance event indicates when the occupant has entered the interior cabin of the vehicle. In response to determining the entrance event has occurred, the one or more controllers determine the one or more possessions that are associated with the occupant based on the image data. The one or more controllers monitor the image data representing the surrounding environment to detect the unauthorized interaction with the one or more possessions associated with the occupant, where the unauthorized interaction indicates an individual is interacting with the one or more possessions associated with the occupant. In response to detecting the unauthorized interaction with the one or more possessions associated with the occupant, the one or more controllers generate a notification informing the occupant of the unauthorized interaction.

In another aspect, the one or more controllers execute instructions to analyze the image data to determine an interior door has opened to allow the occupant within the interior cabin of the vehicle. In response to determining the interior door has opened, the one or more controllers determine the entrance event has occurred.

In yet another aspect, the one or more controllers execute instructions to identify each of the one or more possessions that are a type of container for containing additional objects. The one or more controllers monitor the image data representing the one or more possessions that are identified as containers to determine an unpacking event, where the unpacking event represents the occupant removing an item from a respective container. The one or more controllers associate the item removed from the respective container as one of the possessions.

In an aspect, the one or more controllers executes instructions to monitor the image data representing the occupant for an undressing event, where the undressing event indicates apparel is removed from a body of the occupant. The one or more controllers associate the apparel that was just removed as one of the one or more possessions.

In another aspect, the unauthorized interaction represents the individual transferring the one or more of the possessions to themselves without knowledge by the occupant.

In yet another aspect, the one or more controllers determine the knowledge of the occupant based on a location of a specific possession and a gaze direction of the occupant.

In an aspect, the vehicle is a ridesharing vehicle.

In another aspect, the vehicle is a mass transit vehicle.

In yet another aspect, the one or more possessions include apparel removed from a body of the occupant.

In an aspect, the system further includes a notification device in electronic communication with the one or more controllers, where the notification device generates the notification.

In another aspect, the notification device is one or more of the following: a speaker, a haptic device, and a personal electronic device associated with the occupant.

In yet another aspect, the one or more controllers execute instructions to execute facial recognition software to determine an identity of the individual based on the image data, compare the identity of the individual with a database stored including facial features of family members and friends of the occupant, and in response to determining the identity of the individual does not match the facial features of family members and friends stored upon the database, detect the unauthorized interaction has occurred.

In an aspect, a method for notifying an occupant of a vehicle of unauthorized interaction with one or more possessions is disclosed. The method includes monitoring, by one or more controllers in electronic communication with one or more cameras, image data of a surrounding environment of the occupant, where the surrounding environment of the occupant is an interior cabin of the vehicle. The method includes determining an entrance event based on analyzing the image data of the surrounding environment, where the entrance event indicates when the occupant has entered the interior cabin of the vehicle. In response to determining the entrance event has occurred, the method includes determining the one or more possessions that are associated with the occupant based on the image data. The method includes monitoring the image data representing the surrounding environment to detect the unauthorized interaction with the one or more possessions associated with the occupant, where the unauthorized interaction indicates an individual is interacting with the one or more possessions associated with the occupant. Finally, in response to detecting the unauthorized interaction with the one or more possessions associated with the occupant, the method includes generating a notification informing the occupant of the unauthorized interaction.

In another aspect, the method further comprises analyzing the image data to determine an interior door has opened to allow the occupant within the interior cabin of the vehicle, and in response to determining the interior door has opened, determining the entrance event has occurred.

In yet another aspect, the method further comprises identifying each of the one or more possessions that are a type of container for containing additional objects, monitoring the image data representing the one or more possessions are identified as containers to determine an unpacking event, where the unpacking event represents the occupant removing an item from a respective container, and associating the item removed from the respective container as one of the possessions.

In an aspect, the method includes monitoring the image data representing the occupant for an undressing event, where the undressing event indicates apparel is removed from a body of the occupant and associating the apparel that was just removed as one of the one or more possessions.

In another aspect, the unauthorized interaction represents the individual transferring the one or more of the possessions to themselves without knowledge by the occupant.

In yet another aspect, the method further comprises determining the knowledge of the occupant based on a location of a specific possession and a gaze direction of the occupant.

In an aspect, the method further comprises determining the one or more possessions include apparel removed from a body of the occupant.

In another aspect, the method further comprises executing facial recognition software to determine an identity of the individual based on the image data, comparing the identity of the individual with a database stored including facial features of family members and friends of the occupant, and in response to determining the identity of the individual does not match the facial features of family members and friends stored upon the database, detecting the unauthorized interaction has occurred.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
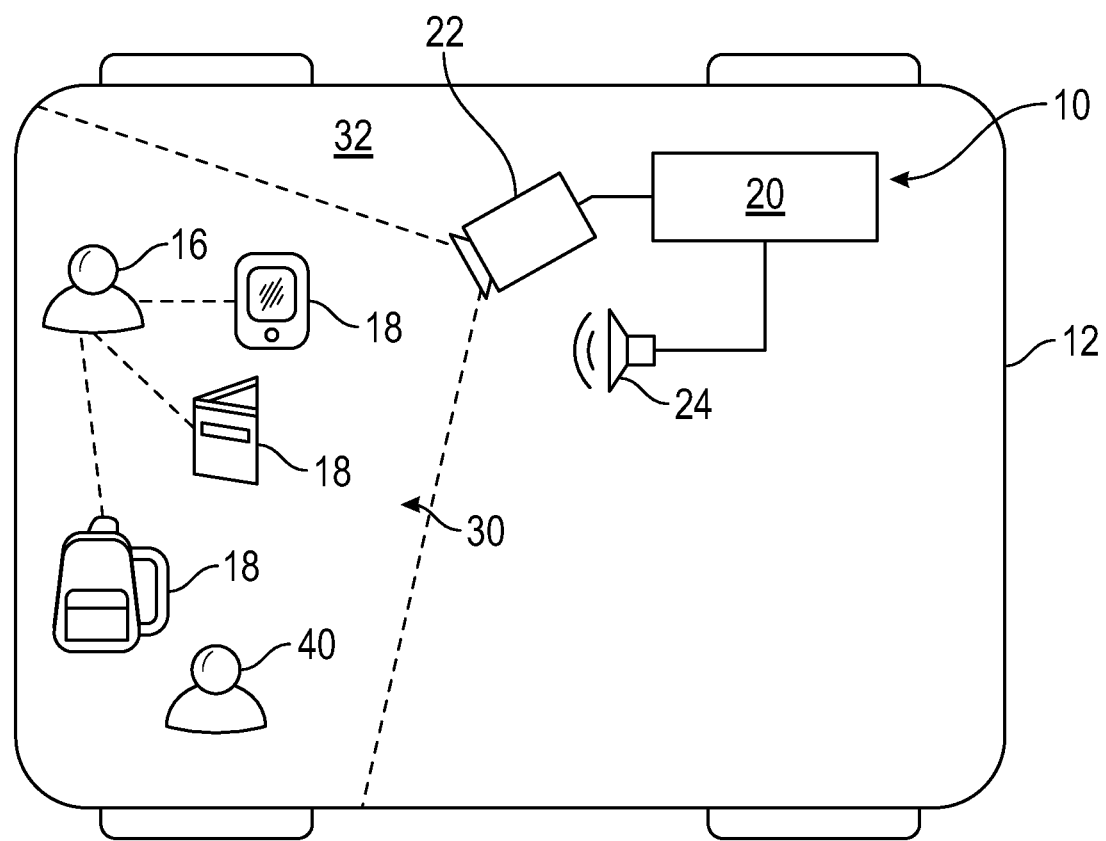
FIG. 1 is a schematic diagram of a vehicle including the disclosed system for notifying an occupant of unauthorized interaction with his or her possessions, according to an exemplary embodiment.

Referring to FIG. 1, a system 10 for notifying an occupant 16 of a vehicle 12 of unauthorized access to one or more of his or her possessions 18 is illustrated. The system 10 includes one or more controllers 20 in electronic communication with one or more cameras 22 and one or more notification devices 24. The one or more cameras 22 collect image data of a surrounding environment 30 of the occupant 16. In the embodiment as shown in FIG. 1, the surrounding environment 30 is an interior cabin 32 of the vehicle 12. The vehicle 12 may be any type of vehicle such as, but not limited to, a sedan, truck, sport utility vehicle, van, or motor home. Specifically, in one non-limiting embodiment, the vehicle 12 is a ridesharing vehicle where the occupant 16 may share the interior cabin 32 with other individuals. In another embodiment, the vehicle 12 is a mass transit vehicle such as, for example, an aircraft, bus, trolley, or train. It is to be appreciated that FIG. 1 is merely exemplary in nature, and the disclosed system 10 is not limited to a vehicle. Indeed, the system 10 may be used in any application where the occupant 16 is located within a designated space where other individuals are present. For example, in another embodiment, instead of the surrounding environment 30 being the interior cabin 32 of the vehicle 12, the surrounding environment 30 is a room or designated space in a public building such as a library, a mall, or a restaurant.

In the example as shown in the figures, the one or more possessions 18 include a smartphone, a book, and a backpack are associated with the occupant 16, however, it is to be appreciated that FIG. 1 is merely exemplary in nature. Indeed, it is to be appreciated that the one or more possessions 18 include any item that is sized for the occupant 16 to carry onboard the vehicle 12. In one embodiment, the possessions 18 include apparel removed from a body of the occupant 16. For example, when the occupant 16 removes a coat, jacket, or shoes, then the possessions 18 include the coat, jacket, or shoes that were just removed. Other examples of possessions 18 include, but are not limited to, sports equipment, keys, a wallet, a purse, grocery items, pets, and small children. Some examples of pets that the occupant 16 may bring onboard the vehicle 12 include dogs and cats.

As explained below, the disclosed system 10 detects, based on the image data collected by the cameras 22, an unauthorized interaction with the one or more possessions 18 associated with the occupant 16 by an individual 40. The individual 40 is present within the interior cabin 32 of the vehicle 12, however, the individual 40 represents a person who is unknown to and is traveling separately from the occupant 16. For example, as explained below, in an embodiment the one or more controllers 20 execute facial recognition software to recognize family members of the occupant 16. The unauthorized interaction indicates that the individual 40 has either contacted or attempted to contact the one or more possessions 18 without consent of the occupant 16. In response to detecting the unauthorized interaction with the one or more possessions 18, the disclosed system 10 generates a notification informing the occupant 16 of the unauthorized interaction.

Continuing to refer to FIG. 1, the notification device 24 generates the notification informing the occupant 16 of the unauthorized interaction. In the example as shown in FIG. 1, the notification device 24 is a speaker for generating an audio indicator, however, it is to be appreciated that FIG. 1 is merely exemplary in nature and other types of devices may be used as well. For example, in another embodiment, the notification device is a haptic device that creates a vibration in a seat of the occupant 16. In still another embodiment, the notification device 24 is a personal electronic device associated with the occupant 16. For example, in an embodiment, the one or more controllers 20 is in wireless communication with a smartphone associated with the occupant 16, where the one or more controllers send a notification to the smartphone of the occupant 16. The one or more controllers 20 execute one or more facial recognition algorithms to detect and identify the occupant 16 and is paired with the smartphone of the occupant 16.

The one or more controllers 20 execute one or more machine learning and computer vision algorithms for analyzing the image data collected of the surrounding environment 30 by the one or more cameras 22. The one or more controllers 20 monitors the image data representing the surrounding environment for an entrance event, where the entrance event indicates when the occupant 16 has entered the interior cabin 32 of the vehicle 12. Specifically, in an embodiment, the one or more controllers 20 analyzes the image data collected by the one or more cameras 22 and determines the entrance event has occurred in response to determining an interior door has opened to allow the occupant 16 within the interior cabin 32 of the vehicle 12.

Continuing to refer to FIG. 1, in response to determining the entrance event has occurred, the one or more controllers 20 determine the one or more possessions 18 that are associated with the occupant 16. Specifically, the one or more controllers 20 determine the one or more possessions 18 associated with the occupant 16 by analyzing the image data collected by the one or more cameras 22 representing the surrounding environment 30. The one or more controllers 20 associate objects that are transported with the occupant 16 as the possessions 18. For example, if the occupant 16 is carrying the backpack, then the backpack is associated with the occupant 16.

The one or more controllers 20 further determine the one or more possessions 18 associated with the occupant 16 based on transitivity. Specifically, the one or more controllers 20 identify each of the possessions 18 that are a type of container for containing additional objects. For example, a backpack, purse, or box would be types of containers that the occupant 16 may carry. The one or more controllers 20 then monitor the image data representing the possessions 18 that are identified as containers to determine an unpacking event, where the unpacking event represents the occupant 16 removing an item from a respective container. For example, the occupant 16 may remove a book from a backpack. In response to determining an unpacking event has occurred, the one or more controllers 20 associate the item removed from the respective container as one of the possessions 18. For example, the book removed from the backpack is now one of the possessions 18.

In another embodiment, the one or more controllers 20 associate items of apparel that are removed from the occupant 16 as the one or more possessions 18. Specifically, the one or more controllers 20 monitor the image data representing the occupant 16 for an undressing event, where the undressing event indicates one or more items of apparel are removed from a body of the occupant 16. For example, the occupant 16 may remove a coat. The one or more controllers 20 then associate the item of apparel that was just removed as one of the one or more possessions 18. In still another example, the one or more controllers associate objects removed from compartments upon the body of the occupant 16 as the one or more possessions 18. For example, the occupant 16 may remove a smartphone from his or her pants pocket. Thus, the one or more controllers 20 classify the smartphone as one of the possessions 18.

The one or more controllers 20 monitor the image data representing the surrounding environment 30 to detect an unauthorized interaction with the one or more possessions 18 associated with the occupant 16, where the unauthorized interaction indicates the individual 40 is interacting with the one or more possessions 18 associated with the occupant 16. Specifically, the one or more controllers 20 monitor the image data to classify a transfer of one or more of the possessions 18 as either an authorized interaction or the unauthorized interaction. The authorized interaction represents the occupant 16 knowingly and willingly transferring the one or more of the possessions 18 to the individual 40. For example, if the image data indicates the occupant 16 hands one of the possessions 18 to the individual 40, then the one or more controllers 20 determine the transfer of one or more of the possessions 18 is an authorized interaction. The unauthorized interaction represents the individual 40 transferring the one or more of the possessions 18 to themselves without knowledge by the occupant 16.

The knowledge of the occupant 16 is determined by the one or more controllers 20 based on a location of a specific possession 18 and a gaze direction of the occupant 16, where knowledge of the occupant 16 is inferred when the gaze direction of the occupant 16 is towards the location of the specific possession 18. For example, if the image data indicates a location of the possessions 18 is on a seat adjacent to the occupant 16, and if the image data further indicates that a gaze direction of the occupant 16 is in a direction other than the possession 18 placed upon the seat, and if the individual 40 takes the possession 18 from the seat, such a transfer of the one or more possessions 18 to the individual 40 is an unauthorized interaction.

In one embodiment, the one or more controllers 20 execute facial recognition software to detect the unauthorized interaction with the one or more possessions 18 associated with the occupant 16. Specifically, the one or more controllers 20 execute facial recognition software to determine an identity of the individual 40 based on the image data. The one or more controllers 20 may compare the identity of the individual 40 with a database stored on a personal electronic device of the occupant 16, where the database includes facial features of family members and friends of the occupant 16. In response to determining the identity of the individual 40 does not match the facial features of family members and friends stored upon the database, the one or more controllers 20 detect the unauthorized interaction has occurred.

Figure 2:
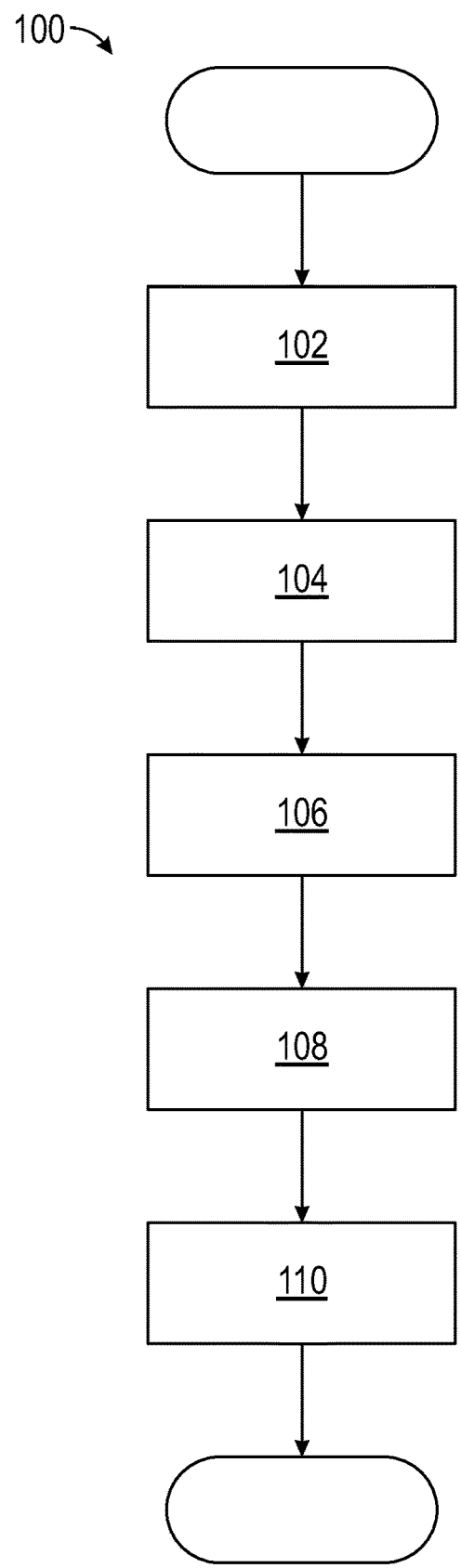
FIG. 2 is a process flow diagram illustrating a method for notifying an occupant of unauthorized interaction with his or her possessions, according to an exemplary embodiment.

FIG. 2 is an exemplary process flow diagram illustrating a method 100 for notifying the occupant 16 of the vehicle 12 of the unauthorized interaction with his or her possessions 18. Referring to both FIGS. 1 and 2, the method 100 may begin at block 102. In block 102, the one or more controllers 20 monitor, by the one or more cameras 22, the image data of the surrounding environment 30 of the occupant 16. The method 100 may then proceed to block 104.

In block 104, the one or more controllers 20 determine the entrance event based on analyzing the image data of the surrounding environment wherein the entrance event indicates when the occupant 16 has entered the interior cabin 32 of the vehicle 12. The method 100 may then proceed to block 106.

In block 106, in response to determining the entrance event has occurred, the one or more controllers 20 determine the one or more possessions 18 that are associated with the occupant 16 based on the image data. The method 100 may then proceed to block 108.

In block 108, the one or more controllers 20 monitor the image data representing the surrounding environment 30 to detect the unauthorized interaction with the one or more possessions 18 associated with the occupant 16, where the unauthorized interaction indicates the individual 40 is interacting with the one or more possessions 18 associated with the occupant 16. The method 100 may then proceed to block 110.

In block 110, in response to detecting the unauthorized interaction with the one or more possessions 18 associated with the occupant 16, the one or more controllers 20 generate the notification informing the occupant 16 of the unauthorized interaction. Specifically, the one or more controllers 20 instruct the notification device 24 to generate the notification. As mentioned above, the notification device 24 may be a speaker, a haptic device, or a personal electronic device associated with the occupant 16. The method 100 may then terminate.

Referring generally to the figures, the disclosed system provides various technical effects and benefits. Specifically, the system provides an approach for notifying an occupant of unauthorized access to his or her possessions. The disclosed system may be especially advantageous when a vision-impaired individual occupies the vehicle, since he or she may not be able to clearly view when someone is accessing his or her possessions.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for notifying an occupant of a vehicle of unauthorized interaction with one or more possessions, the system comprising:
   one or more cameras that collect image data of a surrounding environment of the occupant, wherein the surrounding environment of the occupant is an interior cabin of the vehicle; and
   one or more controllers in electronic communication with the one or more cameras, wherein the one or more controllers execute instructions to:
      monitor, by the one or more cameras, the image data of the surrounding environment of the occupant;
      determine an entrance event based on analyzing the image data of the surrounding environment, wherein the entrance event indicates when the occupant has entered the interior cabin of the vehicle;
      in response to determining the entrance event has occurred, determine the one or more possessions that are associated with the occupant based on the image data;
      monitor the image data representing the surrounding environment to detect the unauthorized interaction with the one or more possessions associated with the occupant, wherein the unauthorized interaction indicates an individual is interacting with the one or more possessions associated with the occupant;
      in response to detecting the unauthorized interaction with the one or more possessions associated with the occupant, generate a notification informing the occupant of the unauthorized interaction;
      monitor the image data representing the occupant for an undressing event, wherein the undressing event indicates apparel is removed from a body of the occupant; and
      associate the apparel that was just removed as one of the one or more possessions.

2. The system of claim 1, wherein the one or more controllers executes instructions to:
   analyze the image data to determine an interior door has opened to allow the occupant within the interior cabin of the vehicle; and
   in response to determining the interior door has opened, determine the entrance event has occurred.

3. The system of claim 1, wherein the one or more controllers executes instructions to:
   identify each of the one or more possessions that are a type of container for containing additional objects;
   monitor the image data representing the one or more possessions that are identified as containers to determine an unpacking event, wherein the unpacking event represents the occupant removing an item from a respective container; and
   associate the item removed from the respective container as one of the possessions.

4. The system of claim 1, wherein the unauthorized interaction represents the individual transferring the one or more of the possessions to themselves without knowledge by the occupant.

5. The system of claim 4, wherein the one or more controllers determine the knowledge of the occupant based on a location of a specific possession and a gaze direction of the occupant.

6. The system of claim 1, wherein the vehicle is a ridesharing vehicle.

7. The system of claim 1, wherein the vehicle is a mass transit vehicle.

8. The system of claim 1, wherein the one or more possessions include apparel removed from a body of the occupant.

9. The system of claim 1, further comprising a notification device in electronic communication with the one or more controllers, wherein the notification device generates the notification.

10. The system of claim 9, wherein the notification device is one or more of the following: a speaker, a haptic device, and a personal electronic device associated with the occupant.

11. The system of claim 1, wherein the one or more controllers execute instructions to:
    execute facial recognition software to determine an identity of the individual based on the image data;
    compare the identity of the individual with a database stored including facial features of family members and friends of the occupant; and
    in response to determining the identity of the individual does not match the facial features of family members and friends stored upon the database, detect the unauthorized interaction has occurred.

12. A method for notifying an occupant of a vehicle of unauthorized interaction with one or more possessions, the method comprising:
    monitoring, by one or more controllers in electronic communication with one or more cameras, image data of a surrounding environment of the occupant, wherein the surrounding environment of the occupant is an interior cabin of the vehicle;
    determining an entrance event based on analyzing the image data of the surrounding environment, wherein the entrance event indicates when the occupant has entered the interior cabin of the vehicle;
    in response to determining the entrance event has occurred, determining the one or more possessions that are associated with the occupant based on the image data;
    monitoring the image data representing the surrounding environment to detect the unauthorized interaction with the one or more possessions associated with the occupant, wherein the unauthorized interaction indicates an individual is interacting with the one or more possessions associated with the occupant;
    in response to detecting the unauthorized interaction with the one or more possessions associated with the occupant, generating a notification informing the occupant of the unauthorized interaction;
    monitoring the image data representing the occupant for an undressing event, wherein the undressing event indicates apparel is removed from a body of the occupant; and
    associating the apparel that was just removed as one of the one or more possessions.

13. The method of claim 12, wherein the method further comprises:
    analyzing the image data to determine an interior door has opened to allow the occupant within the interior cabin of the vehicle; and
    in response to determining the interior door has opened, determining the entrance event has occurred.

14. The method of claim 12, wherein the method further comprises:
    identifying each of the one or more possessions that are a type of container for containing additional objects;
    monitoring the image data representing the one or more possessions are identified as containers to determine an unpacking event, wherein the unpacking event represents the occupant removing an item from a respective container; and
    associating the item removed from the respective container as one of the possessions.

15. The method of claim 12, wherein the unauthorized interaction represents the individual transferring the one or more of the possessions to themselves without knowledge by the occupant.

16. The method of claim 15, wherein the method further comprises:
    determining the knowledge of the occupant based on a location of a specific possession and a gaze direction of the occupant.

17. The method of claim 12, wherein the method further comprises:
    determining the one or more possessions include apparel removed from a body of the occupant.

18. The method of claim 12, wherein the method further comprises:
    executing facial recognition software to determine an identity of the individual based on the image data;
    comparing the identity of the individual with a database stored including facial features of family members and friends of the occupant; and
    in response to determining the identity of the individual does not match the facial features of family members and friends stored upon the database, detecting the unauthorized interaction has occurred.

19. The system of claim 1, wherein the one or more controllers execute instructions to:
    monitor the image data representing the surrounding environment to detect an authorized interaction with the one or more possessions associated with the occupant, wherein the authorized interaction represents the occupant knowingly and willingly transferring the one or more of the possessions to the individual.

20. The method of claim 12, wherein the method further comprises:
    monitoring the image data representing the surrounding environment to detect an authorized interaction with the one or more possessions associated with the occupant, wherein the authorized interaction represents the occupant knowingly and willingly transferring the one or more of the possessions to the individual.

* * * * *